United States Patent Office 3,582,449
Patented June 1, 1971

---

3,582,449
COLD-FORMABLE SHEET-LIKE COMPOSITE
Thomas J. Stolki, Wilbraham, Mass., and Thor J. G. Lonning, Suffield, Conn., assignors to Monsanto Company, St. Louis, Mo.
Filed June 10, 1969, Ser. No. 831,892
Int. Cl. B32b 27/12; C08f 15/00
U.S. Cl. 161—89                    7 Claims

ABSTRACT OF THE DISCLOSURE

Composites which utilize an interlayer of metal between a sheet of graft copolymer of monovinyl aromatic compound on an elastomer and a sheet of monovinyl aromatic compound/elastomer interpolymer modified vinyl halide polymer. The composites display improved heat resistance and can be cold formed.

BACKGROUND

In the art of plastics, there has been a long felt need for sheet-like composites which are both cold-formable and heat resistant in the manner of conventionally formed or worked sheet metal. As used throughout this document, the terms "cold-formable," "cold-formed," and/or "cold-forming," have reference to the fact that a composite can be conformed to a predetermined shape upon the application to at least one face thereof of sufficient pressure to bend the starting composite formed into the desired predetermined shape under substantially room temperature conditions without substantially altering the structure of the composite or deteriorating its inherent physical and chemical properties. Similarly, as used throughout this document, the terms "heat resistant" and/or "heat resistance" have reference to the fact that a composite has the capacity to resist deformation at elevated temperatures (e.g. at temperatures of about 200° F. or even higher). Heretofore, prior art plastic composites generally have not been cold-formable and/or heat resistant for a number of reasons.

For one reason, prior art composites especially those containing glass fibers have tended to crack or become embrittled upon being cold-formed and thereby tend to loose their structural integrity and/or physical strength characteristics.

For another reason, prior art composites were often so expensive and costly as to be completely non-competitive for applications involving the use of sheet metal. Frequently, in the art of plastics and plastic composites, it has been easier from a processing standpoint and from a starting material standpoint to employ heated molding procedures and gluing procedures to fabricate plastic articles of manufacture rather than to employ cold-forming techniques.

There has now been discovered, however, a sheet-like composite utilizing two sheets of plastic material, each of a different composition, which are laminated together through an interlayer of metal. The product composite has generally unexpected and superior cold formability and heat resistance properties. The discovery also includes methods for making such composites.

SUMMARY

This invention is directed to sheet-like composites which are adapted to be cold formed and which are heat resistant. These composites characteristically utilize two different plastic layers laminated together through a metallic interlayer.

A first layer of such a composite of this invention comprises at least one interpolymer having a superstrate composed of from about 50 to 98 weight percent of chemically combined monovinyl aromatic compound and from about 0 to 48 weight percent of chemically combined other monomer polymerizable therewith grafted upon a substrate composed of from 2 to 50 weight percent (all based on 100 weight percent interpolymer) of an elastomer having a glass phase transition temperature below about 0° C. and a Youngs Modulus of less than about 40,000 p.s.i. Such first layer is further characterized by having:

(A) A transverse average thickness of from about 0.007 to 0.25 inch,
(B) A modulus of elasticity of from about 200,000 to 600,000 p.s.i. at 73° F., (determined, for example, using ASTM procedure D–882–61–T for rigid and semi-rigid film and sheeting), and
(C) A tensile elongation to fail of at least about 5 percent at 73° F.

A second layer of such a composite comprises on a 100 weight percent basis from about 5 to 70 weight percent of generally continuous, generally elongated metal portions with open spaces defined therebetween. At least about 95 weight percent of said metal portions have a maximum length to minimum width ratios of at least about $10^3/1$ (in a 6.0 inch square sample of said second layer). This said second layer has a transverse average thickness ranging from about 2 to 85 percent of the total transverse average thickness of said composite.

A third layer of such composite comprises from about 50 to 98 weight percent of at least one vinyl halide polymer and (as a modifier) from about 2 to 48 weight percent of at least one interpolymer having a superstrate comprising from about 20 to 80 weight percent chemically combined monovinyl aromatic compound and, correspondingly, from about 80 to 20 weight percent chemically combined alpha-electronegatively substituted ethenes )based on 100 weight percent superstrate having a glass phase transition temperature below about 0° C. and a Youngs Modulus of less than about 40,000 p.s.i. and grafted upon an elastomer substrate which comprises from about 2 to 50 weight percent of total interpolymer weight (the balance up to 100 weight percent of said interpolymer being said superstrate).

This said third layer is further characterized by having:

(A) A transverse average thickness of from about 0.007 to 0.25 inch,
(B) A modulus of elasticity of from about 200,000 to 600,000 p.s.i. at 73° F. (as determined, for example, using ASTM procedure D–882–61–T for rigid and semi-rigid film and sheeting), and
(C) A tensile elongation to fail of at least about 5 percent at 73° F.

This second layer is positioned between said first layer and said third layer and is substantially completely enclosed thereby. Said first layer and said third layer are directly bonded to one another at substantially all places of interfacial contact therebetween through said second layer's open spaces.

This invention is also directed to methods for making such composites, and to the cold-formed articles of manufacture made from such composites.

For purposes of this invention, the term "sheet-like" has refeernce to sheets, films, tubes, extrusion profiles, discs, cones, and the like, all generally having wall thicknesses corresponding to the thickness of the matrix layer. Those skilled in the art will appreciate that under certain circumstances, three dimensional sheet-like composites of the invention may, without departing from the spirit and scope of this invention, in effect be filled with some material. In general, a sheet-like composite of the invention is self-supporting, that is, it exists in air at room conditions without the need for a separate solid supporting member in face-to-face engagement therewith in order to maintain the structural integrity thereof without composite deterioration (as through splitting, cracking, or the like).

For purposes of this invention, tensile modulus of elasticity, tensile elongation to fail, flexibility, and the like, are each conveniently measured (using ASTM Test Procedures or equivalent).

For purposes of this invention, the term "layer" has generic reference to sheets, films, and the like.

Starting materials—first layer

In general, the first layer can comprise any interpolymer system having characteristics as above indicated. Such a rubber modified interpolymer system of monovinyl aromatic compound typically comprises:

(A) A graft copolymer produced by polymerizing monovinyl aromatic compound in the presence of a preformed elastomer, and mixtures of such;

(B) A graft copolymer produced by polymerizing monovinyl aromatic compound and at least one other monomer polymerizable therewith in the presence of a preformed elastomer, and mixtures of such; and/or (C) A mechanical mixture of (A) and/or (B).

As used herein, the term "monovinyl aromatic compound" has reference to styrene (preferred); alkyl-substituted styrenes, such as ortho-, meta-, and para-methyl styrenes; 2,4-dimethylstyrene, para-ethylstyrene, p-t-butyl styrene, alpha-methyl styrene, alpha-methyl-p-methylstyrene, or the like; halogen substituted styrenes, such as ortho-, eta-, and para-chlorostyrenes, or bromostyrenes, 2,4-dichlorostyrene, or the like; mixed halo-alkyl-substituted styrenes, such as 2-methyl-4-chlorostyrene, and the like; vinyl naphthalenes; vinyl anthracenes; mixtures thereof; and the like. The alkyl substituents generally have less than five carbon atoms per molecule, and may include isopropyl and isobutyl groups.

In general, such an interpolymer system has a number average molecular weight ($\overline{M}_n$) ranging from about 20,000 through 120,000 and the ratio of weight average molecular weight ($\overline{M}_w$) to number average molecular weight $\overline{M}_w/\overline{M}_n$ ranging from about 2 through 10.

In general, suitable elastomers for use in this invention can be saturated or unsaturated, and have a glass phase or second order transition temperature below about 0° C. (preferably below about −25° C.), as determined, for example, by ASTM Test D–746–52T, and have a Young's Modulus of less than about 40,000 p.s.i. Examples of suitable elastomers include unsaturated elastomers such as homopolymers or copolymers of conjugated alkadienes (such as butadiene or isoprene), where, in such copolymers, at least 50 percent thereof is the conjugated alkadiene; ethylene/propylene copolymers, neoprene, butyl elastomers, and the like; and saturated elastomers such as polyurethane, silicone rubbers, acrylic rubbers, halogenated polyolefins, and the like.

A preferred class of elastomers for use in this invention are diene polymer elastomers. Examples of diene polymer elastomers include, for example, natural rubber having isoprene linkages, polyisoprene, polybutadiene (preferably one produced using a lithium alkyl or Ziegler catalyst), styrene-butadiene copolymer elastomers, butadiene acrylonitrile copolymer elastomer, mixtures thereof, and the like. Such elastomers include homopolymers and interpolymers of conjugated 1,3-dienes with up to an equal amount by weight of one or more copolymerizable monoethylenically unsaturated monomers, such as monovinyl aromatic compounds: acrylonitrile, methacrylonitrile; alkyl acrylates (e.g. methyl acrylate, butyl acrylate, 2-ethylhexyl acrylate, etc.); the corresponding alkyl methacrylates, acrylamides (e.g. acrylamide, methacrylamide, N-butyl acrylamide, etc.); unsaturated ketones (e.g. vinyl methyl ketone, methyl isopropenyl ketone, etc.); alpha-olefins (e.g. ethylene, propylene, etc.); pyridines; vinyl esters (e.g. vinyl acetate, vinyl stearate, etc.); vinyl and vinylidene halides (e.g. the vinyl and vinylidene chlorides and bromides, etc.); and the like.

A more preferred group of diene polymer elastomers are those consisting essentially of 75.0 and 100.0 percent by weight of butadiene and/or isoprene and up to 25.0 percent by weight of a monomer selected from the group consisting of monovinyl aromatic compounds and unsaturated nitriles (e.g. acrylonitrile), or mixtures thereof. Particularly advantageous elastomer substrates are butadiene homopolymer or an interpolymer of 90.0 to 95.0 percent by weight butadiene and 5.0 to 10.0 percent by weight of acrylonitrile or styrene.

Another preferred class of rubbers for use in this invention are acrylic rubbers. Such a rubber may be formed from a polymerizable monomer mixture containing at least 40 weight percent of at least one acrylic monomer of the formula:

(1) 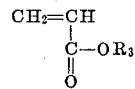

where $R_3$ is a radical of the formula:

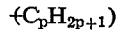

and $p$ is a positive whole number of from 4 through 12.

Although the rubber may generally contain up to about 2.0 percent by weight of a crosslinking agent, based on the weight of the rubber-forming monomer or monomers, crosslinking may present problems in dissolving the rubber in monomers for a graft polymerization reaction (as when one makes an interpolymer system as described in more detail hereinafter). In addition, excessive crosslinking can result in loss of the rubbery characteristics. The crosslinking agent can be any of the agents conventionally employed for crosslinking rubbers, e.g. divinyl benzene, diallyl maleate, diallyl fumarate, diallyl adipate, allyl acrylate, allyl methacrylate, diacrylates and dimethacrylates of polyhydric alcohols, e.g. ethylene glycol dimethacrylate, etc.

One preferred class of monomers for copolymerizing with monovinyl aromatic compounds to produce interpolymer systems suitable for use in this invention as indicated above are alpha-electronegatively substituted ethenes. Suitable such monomers are represented by the generic formula:

(2) 

where

X is selected from the group consisting of —CN, —COOR$_2$, and —CONHR$_2$,

R$_1$ is selected from the group consisting of hydrogen, —C$_n$H$_{2n+1}$), —C$_n$H$_{2n}$)—CN, and

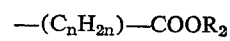

R$_2$ is selected from the group consisting of hydrogen, and —C$_m$H$_{2m+1}$), $n$ is an integer of from 1 through 4, and $m$ is an integer of from 1 through 8.

Suitable ethene nitrile compounds of Formula 2 are especially preferred and include acrylonitrile (preferred), methacrylonitrile, ethacrylonitrile, 2,4 - dicyanobutene-1, mixtures thereof, and the like.

Suitable acrylic compounds of Formula 2 are especially preferred and include unsaturated acids such as acrylic acid and methacrylic acid; 2,4-dicarboxylic acid butene-1, unsaturated esters, such as alkyl acrylates (e.g. methyl acrylate, ethyl acrylate, butyl acrylate, octyl acrylate, etc.), and alkyl methacrylates (e.g. methyl methacrylate, ethyl methacrylate, butyl methacrylate, octyl methacrylate, etc.); unsaturated amides, such as acrylamide, methacrylamide, N-butyl acrylamide, etc.; and the like.

Another preferred class of monomers for copolymerizing with monovinyl aromatic compounds as indicated above are conjugated alkadiene monomers. Suitable such monomers include butadiene, 3-methyl-1,3-butadiene, 2-methyl-1,3-butadiene, piperylene chloroprene, mixtures thereof and the like. Conjugated 1,3-alkadienes are especially preferred.

Another preferred class of monomers for copolymerizing with monovinyl aromatic compounds as indicated above are unsaturated esters of dicarboxylic acids, such as dialkyl maleates, or fumarates, and the like.

Considered as a whole, "other monomer polymerizable" with a monovinyl aromatic compound is commonly and preferably an ethylenically-unsaturated monomer.

Optionally, a polymerization of monovinyl aromatic compound with at least one other monomer polymerizable therewith may be conducted in the presence of up to about 2 weight percent (based on total product polymer weight) of a crosslinking agent such as a divinyl aromatic compound, such as divinyl benzene, or the like. Also optionally, such an interpolymer system may have chemically incorporated thereinto (as through polymerization) a small quantity, say, less than about 2 weight percent (based on total polymer weight) of a chain transfer agent, such as an unsaturated terpene (like terpinolene), an aliphatic mercaptan, a halogenated hydrocarbon, an alpha-methylstyrene dimer, or the like.

In any given rubber-modified interpolymer system of monovinyl aromatic compound as described above, there is preferably from about 55 to 75 weight percent monovinyl aromatic compound; about 5 to 45 weight percent other monomer polymerizable therewith, and from about 5 to 40 weight percent elastomer (same basis). Of course, any given matrix of such a system is chosen so as to have physical characteristics as above indicated.

Preferred rubber modified interpolymer systems of monovinyl aromatic compounds are graft copolymers of Type B above. More preferred such graft copolymers are those of monovinyl aromatic compound, and alpha-electronegatively substituted ethene grafted onto preformed elastomer substrate such as a polybutadiene; in such a polymer system, the amount of monovinyl aromatic of chemically combined alpha-electronegatively substituted ethene ranges from about 80 to 5 percent (preferably from about 10 to 25 weight percent). In addition, the amount of chemically combined conjugated alkadiene monomer typically ranges up to about 25 weight percent and preferably from about 5 to 20 weight percent. Such a graft copolymer blend usually has a specific viscosity of from about 0.04 to 0.15, preferably about 0.07 to 0.1, measured as a solution of 0.1 percent of the polymer in dimethylformamide at 25° C.

Styrene and acrylonitrile are presently particularly preferred superstrate monomers. Although the amount of copolymer superstrate grafted onto the rubber substrate may vary from as little as 10 parts by weight per 100 parts of substrate to as much as 250 parts per 100 parts, and even higher, the preferred graft copolymers have a superstrate-substrate ratio of about 30–200:100 and most desirably about 30–100:100. With graft ratios above 30:100, a highly desirable degree of improvement in various properties generally is obtained.

The interpolymer systems used in this invention may be produced by various known polymerization techniques, such as mass, emulsion, suspension and combinations thereof. Whatever polymerization process is employed, the temperature, pressure and catalyst (if used) should be adjusted to control polymerization so as to obtain the desired product interpolymer. If so desired, one or more of the monomers may be added in increments during polymerization for the purposes of controlling viscosity and/or molecular weight and/or composition. Moreover, it may be desirable to incorporate low boiling organic, inert liquid diluents during a mass polymerization reaction to lower the viscosity, particularly when a rubber is employed. Moreover, the catalyst may be added in increments, or different catalyst may be added at the same time or at different points during the reaction. For example, when a combined mass-suspension process is employed, generally oil-soluble catalysts may be employed; and both low and high temperature catalysts may be advantageously used in some reactions.

Mechanical blends may be prepared by simple, conventional physical intermixing of preformed polymers. Conveniently, one uses starting materials in a solid, particulate form, and employs such conventional equipment as a ribbon blender, a Henschel mixer, a Waring Blendor, or the like.

Graft copolymers may be prepared, for example, by polymerizing monomers of the interpolymer in the presence of the preformed elastomer substrate, generally in accordance with conventional graft polymerization techniques, involving suspension, emulsion or mass polymerization, or combinations thereof. In such graft polymerization reactions, the preformed rubber substrate generally is dissolved in the monomers and this admixture is polymerized to combine chemically or graft at least a portion of the interpolymer upon the rubber substrate. Depending upon the ratio of monomers to rubber substrate and polymerization conditions, it is possible to produce both the desired degree of grafting of the interpolymer onto the rubber substrate and the polymerization of ungrafted interpolymer to provide a portion of the matrix at the same time. A preferred method of preparation involves carrying out a partial polymerization in a bulk system with the rubber dissolved in a mixture of the ethene monomers and vinyl aromatic monomers, followed by completion of the polymerization in an aqueous suspension system.

Blends may be prepared by blending latices of a graft copolymer and an interpolymer and recovering the polymers from the mixed latices by any suitable means, e.g. drum-drying, spray-drying, coagulating, etc. Preferably, they are prepared by simply blending a mixture of the interpolymer and the hydroxylated graft copolymer at an elevated temperature for a period of time sufficient to provide an intimate fusion blend of the polymers. Blends of graft copolymer and copolymer can be prepared by simply blending the two polymers together on conventional plastics working equipment, such as rubber mills, screw-extruders, etc.

As suggested above, the rubber modified interpolymer systems used in this invention containing monovinyl aromatic compound, elastomer, and, optionally, at least one other monomer copolymerizable with such monovinyl aromatic compound. In such a system, at least about 2 weight percent of the elastomer present is graft polymerized as a substrate to (as indicated) a superstrate of monovinyl aromatic compound and (optionally and preferably) other monomer polymerizable therewith. Typically, a small amount of the superstrate interpolymer is not in chemical combination with the rubber substrate because of the less than 100 percent grafting efficiency of conventional graft copolymerization reactions.

The above-described interpolymer systems are generally well known to the prior art and do not constitute part of the present invention. However, they are to be distinguished from prior art polymer systems such as those of styrene only with no appreciable amounts of elastomer present (sometimes known as homopolystyrene, as opposed to what is known, for example, as a graft copolymer of styrene on a preformed elastomer). Thus, polystyrene characteristically is a brittle plastic which has a higher softening temperature, and a lower elongation to failure than does such a graft copolymer. In addition, homopolystyrene has different solubility characteristics and thermal stability characteristics than do such graft copolymers. It is the superior combination of properties associated with such graft copolymers which is believed to contribute to making them valuable as starting materials in making the surprising and unexpected composites of the present invention.

It will be appreciated that in any given first layer used in this invention, minor amounts of additional additives can be present with one such rubber modified interpolymer system of monovinyl aromatic compound, such as monovinyl aromatic compound polymer, a copolymer of monovinyl aromatic compound and at least one other monomer polymerizable therewith, an elastomer, and/or conventional plastic processing adjuvants, organic or inorganic fillers, flame retardants, antioxidants, stabilizers, plasticizers, and the like, assuming, for example, no adverse effect upon desired physical properties of a first layer (as indicated above). Assuming compatibility with no adverse effect upon the desired end composite properties of improved cold formability and heat resistance, a given first layer may also contain a minor amount of another polymer, such as a polyvinyl chloride, a polycarbonate, a polysulfonate, a polyphenyleneoxide, a polyamide, or the like, depending upon individual wishes or circumstances, without departing from the spirit and scope of this invention. Fibrous fillers may be used. Typically, the amount of such an additive is less than about 15-20 weight percent of total first layer weight.

Depending on the method of fabricating a sheet-like composite of the present invention, a first layer comprising such interpolymer system is conventionally made into sheet or film form by the usual techniques conventionally employed in the plastics industry to make such plastic materials.

Starting materials—second layer

Any metal layer having characteristics as above-described can be used as an interlayer in practicing this invention. Such layers are known to the prior art, and can have a variety of physical forms, as those skilled in the art will appreciate, but always have elongated metal portions.

As used herein, the phrase "generally continuous, generally elongated metal portions" has reference to the fact that in any given metal layer or interlayer the component metal portions thereof are generally continuous and unbroken preferably in at least one direction, taken generally in relation to one face of a first or second layer in a given composite, and also such component metal portions are generally co-extensive with such matrix in such direction. Preferably, such component metal portions are generally continuous and unbroken in at least two such directions (more preferably, one such direction being at 90° with respect to the first), and also such portions are generally co-extensive with such first and second layers in such directions. An interlayer by itself is self-supporting (that is, it is not composed of loose, non-interconnected or non-coherent metal portions). The form of an interlayer is generally unimportant; interlayers may be pleated, knitted, etc. Considered individually, a metal portion of an interlayer need have no particular cross-sectional configuration or spatial orientation. The spacing between adjacent filaments or metal portions is not critical, but it is preferred that such be at least sufficient to permit the interpolymer system or systems used in a given instance to flow thereinto during manufacture, for example, by the application of heat and pressure to exposed, opposed faces of a composite being made. In any given interlayer of a particular composite, the metal portions are preferably similar in character to one another to enhance uniformity of product characteristics in a finished composite.

Preferably, a given interlayer has the open spaces between such metal portions occurring in a generally regular and recurring pattern. The phrase "generally regular and recurring pattern" has reference to the fact that in an interlayer there is a predictable relationship between one relatively sub-portion thereof and another, as viewed from a face thereof in a macroscopic sense. Such a regular and recurring pattern, and such continuous, elongated metal portions, in an interlayer are deemed preferable to obtain the cold formability and heat resistance associated with composite products of this invention. Examples of two classes of metal layers having such a space pattern are woven wire mesh, and perforated sheet metal (including, generically, both perforated and expanded metal, and the like). Examples of suitable metals for woven wire mesh and perforated metal include ferrous metals (iron, steel, and alloys thereof), cuprous metals (copper, brass, and alloys thereof), aluminum and aluminum alloys, titanium, tantalum noble metals, and the like.

Another class of interlayers useful in the practice of this invention are those metal layers composed namely of generally randomly arranged, discrete metal filaments which class is sometimes called the metal wools. These filaments may typically have average maximum cross-sectional dimensions ranging from about 5 to 100 mils, and at least about 95 weight percent (based on total interlayer weight) of all such filaments have length to width ratios in excess of about $10^3/1$, (preferably $10^4/1$).

Metal wool is made by shaving thin layers of steel from wire. Typically, the wire is pulled or drawn past cutting tools or through cutting dies which shave off chips or continuous pieces. Steel wire used for the manufacture of steel wool is of generally high tensile strength and typically contains from about 0.10 to 0.20 percent carbon and from about 0.50 to 1 percent manganese (by weight), from about 0.02 to 0.09 percent sulphur, from about 0.05 to 0.10 percent phosphorous and from about 0.001 to 0.010 percent silicon. Preferably, such wire used as a starting material displays an ultimate tensile strength of not less than about 120,000 pounds per square inch. Metals other than steel are also made into wool by the same processes and when so manufactured have the same general physical characteristics. Thus, metal wools are made from such metals as copper, lead, aluminum, brass, bronze, Monel metal, and nickel, and the like. Techniques for the manufacture of metal wools are well known; see, for example, U.S.P. 888,123; U.S.P. 2,256,923; U.S.P. 2,492,019; U.S.P. 2,700,811; and U.S.P. 3,050,825.

Commonly, a single filament of a metal wool has three edges, but may have four or five, or even more. In a given wool, the strands or filaments of various types may be mixed. Finest strands or fibers are commonly no greater than about 0.0005 and the most commonly used type or grade of wool has fibers varying from about 0.002 to 0.004 inch. Commercially, metal wools are classified into seven or nine distinct types or grades. A given metal wool is in the form of a pad or compressed mat of fibers and, as such, is used as an interlayer in composites of this invention. Although the arrangement of fibers in such a pad or mat is generally random, the pad or mat may have imparted thereto a cohesive character by various processes in which groups of fibers are pulled through or twisted with or otherwise mechanically interlocked loosely with other fibers of the whole mat; however, considering the product mat as a whole, the fibers thereof are randomly arranged and in a substantially non-woven condition.

Still another class of metal layers which may be used in practicing this invention are metal honeycombs, such as those conventionally fabricated of aluminum, steel, or other metals. Because of structural and rigidity considerations, honeycombs under 150 mils in transverse thickness are preferred for use in this invention.

The strength and stiffness of composites of this invention containing honeycomb interlayers are influenced by honeycomb cell shape and size, as well as by the gross thickness and mechanical properties thereof. Increasing honeycomb thickness generally results in higher section modulus and increased moment of inertia for a composite as a whole. In a product composite, shear load orientation should be considered in relationship to the particular use to which it is desired to place a product composite. In general, shear strength and modulus tend to be anisotropic, being influenced by the cell structure of a given honeycomb interlayer; anisotropic shear property differences are particularly noticeable in hexagonal cell honeycomb structures. In general, smaller interlayer cell size and thicker cell walls result in higher compressive strength; however, density increases. Compressive strength in a product composite can be increased by using interlayers having stronger cell walls (for example, by shifting from 3003 aluminum to 5056 aluminum) without a weight penalty.

Assuming, of course, compatibility, and no adverse effect upon the desired end composite properties of improved cold formability and heat resistance, a given interlayer may also have as an integral part thereof nonmetallic portions, say up to about 20 weight percent thereof, or somewhat more, but preferably not more than about 10 weight percent thereof, and more preferably not more than about 3 weight percent thereof. Such nonmetallic portions may be applied by dipping, spraying, painting, or the like, and may serve, for example, as electrical insulation, to insulate individual strands one from the other as when an electric current is to be passed through a product composite, or, for another example, as an organic or inorganic coating, over the interlayer to enhance, for instance, bonding and adherence between interlayer and matrix layer. Such non-metallic portions are within the contemplation of this invention and are generally obvious to those skilled in the art as it exists today at the time of the present invenion.

It will be appreciated that while an interlayer need not be bonded to the mtrix, such is a preferred condition, in general. Observe that an interlayer is fully enclosed by the matrix layer (except possibly at extreme edge regions) and that the matrix material always extends between the open spaces in an interlayer in a continuous manner.

In general, it is preferred for purposes of the present invention to preform an interlayer before combining it with matrix layers. The flexibility of the interlayer (that is the ability of an interlayer to be moved transversely in response to a gross force, as compared to a pointed or highly localized force, applied against one face of the interlayer with the end edges of an interlayer sample being positioned in a generally planar configuration) is preferably at least as great as the flexibility of the matrix layer similarly measured but without an interlayer being positioned in such matrix layer.

Starting materials—third layer

Any modified vinyl halide polymer composition having characteristics as above defined can be used in composites of this invention.

The term "vinyl halide polymer" as used herein includes a polymer produced not only by polymerizing vinyl chloride monomer to produce polyvinyl chloride homopolymer, but also by copolymerizing vinyl chloride monomer with other ethylenically unsaturated aliphatic monomers having molecular weights generally under about 260 and copolymerizable with vinyl chloride to produce polyvinyl chloride include olefins.

Vinyl halide polymers are well known. The vinyl halides which are generally suitable for use in the vinyl halide polymer include vinyl chloride and vinyl fluoride; vinyl chloride is the preferred monomer and may be used alone or in combination with vinyl fluoride and/or other ethylenically unsaturated compound copolymerizable therewith. In the case of a copolymer with another ethylenically unsaturated compound, the amount of comonomer generally does not exceed about 25 percent of the weight of the resulting vinyl halide polymer, and preferably the amount of the second component is less than about 15 percent of the product.

Ethylenically unsaturated monomers which may be interpolymerized with the vinyl halides typically have molecular weighs under about 260 and include vinylidene halides such as vinylidene chloride; vinyl esters of monobasic organic acids containing 1–20 carbon atoms such as vinyl acetate; acrylic and alpha-alkyl acrylic acids, such as acrylic and methacrylic acids; the alkyl esters of such acrylic and alkyl-acrylic acids containing 1–20 carbon atoms such as methyl acrylate, ethyl acrylate, butyl acrylate, octadecyl acrylate and the corresponding methyl methacrylate, esters; dialkyl esters of dibasic organic acids in which the alkyl groups contain 2–8 carbon atoms, such as dibutyl fumarate, diethyl maleate, etc.; amides of acrylic and alkyl-acrylic acids, such as acrylamide, methacrylamide; unsaturated nitriles, such as acrylonitrile, methacrylonitrile, ethacrylonitrile; monovinylidene aromatic hydrocarbons, such as styrene and alpha-alkyl styrenes; dialkyl esters of maleic acid, such as dimethyl maleate and the corresponding fumarates; vinyl alkyl ethers and ketones such as vinyl ether, 2-ethyl hexyl vinyl ether, benzyl ether, etc. and various other ethylenically unsaturated compounds copolymerizable with the vinyl halides. Mixtures of compounds exemplified by the foregoing materials may also be used.

The method used to prepare the vinyl halide resins may be any which is commonly practiced in theart; the polymerization may be effected en masse, in solution or with the monomer in aqueous dispersion. From the standpoint of economics and process control, highly suitable polymers for the matrix phase can be prepared by a method in which the monomer reactants are suspended in water. Other variations upon the polymerization method may also be utilized in order to vary the properties of the product, one example of which is polymerization at relatively high temperatures which normally produces polymers having the characteristics desired in the matrix resin. Highly fluid resins can also be prepared by utilizing a technique in which the monomer charge or a portion thereof is continuously fed to the reaction vessel, which is believed to promote branching.

Two or more vinyl halide polymers may be used in admixture. One such polymer may be dispersed as a discontinuous phase in another.

Preferred vinyl halide polymers have chlorine contents ranging from about 45.0 to 56.7 and have molecular weights such that a 0.4 weight percent solution of such polymer in cyclohexanone at 25° C. has a specific viscosity of from about 0.3 to 0.6. More preferred specific viscosities range from about 0.4 to 0.5. A preferred class of vinyl chloride polymer is polyvinyl chloride homopolymer.

The class of modifiers used with such vinyl halide polymers can comprise any interpolymer system having characteristics as above indicated.

The interpolymers can employ, as alpha-electronegatively substituted ethenes compounds of Formula 2 above with preferences as indicated. Except for the indicated composition of the superstrate, these interpolymers are similar to the interpolymers used in the first layer and are prepared by the same procedures. Like the interpolymers used in the first layer, these interpolymers used as modifiers here are likewise well known to the prior art. Therefore, no detailed description thereof is deemed necessary or desirable here.

It is preferred that these modifier interpolymers have, in order to be substantially fully compatible with the vinyl halide polymers, a cohesive energy density not greatly different from that of the particular vinyl halide polymers used in a given composite. As those skilled in the art appreciate, cohesive energy densities are generally conveniently expressed as solubility parameters, the square root of the cohesive energy density generally being equal to the solubility parameter. Thus, for example, since the solubility parameter for polyvinyl chloride is given in the literature as 9.53, the solubility parameter of the modifier should not deviate far from this value. It is generally preferred for purposes of this invention that the solubility parameter of the modifier used be in the range of from about 8.5 to 10.5. References describing cohesive energy density and solubility parameters include Hildebrand, J. Chem. Phy., vol. 1, p. 317 (1933); Small, J. App. Chem., vol. 3, p. 71 (1953); Brestow et al., Trans. Far. Soc., vol. 54, p. 1731 (1958); Baranwal, J. Makrom. Chem., vol. 100, p. 242 (1967); etc.

Descriptions in the literature of vinyl halide polymers modified with such interpolymers appear in, for examples, Hayes, U.S. Pat. 2,802,809; Jennings, U.S. Pat. 2,646,417; Smith, U.S. Pat. 3,367,997; Feuer, U.S. Pat. 2,943,074; Schwaegerle, U.S. Pat. 2,791,600; Feuer, U.S. Pat. 2,857,360; Daly, U.S. Pat. 3,017,268; Calvert, U.S. Pat. 3,074,906; Saito et al., 3, 287,443; Sakuma et al., U.S. Pat. 3,336,417; Schmidt, U.S. Pat. 3,354,238; Graham et al., U.S. Pat. 2,926,126; Jen, U.S. Pat. 2,958,673; Calvert, U.S. Pat. 3,047,533; Vollmert, U.S. Pat. 3,055,859; Sander et al., U.S. Pat. 3,261,904; Sievel et al., U.S. Pat. 3,275,712; Ott et al., U.S. Pat. 3,287,445; Calentine et al., U.S. Pat. 3,334,156; Schmidle et al., U.S. Pat. 3,397,166; Ryan, U.S. Pat. 3,426,101; Himer U.S. Pat. 3,288,886; United Kingdom Patent 1,124,911; Baer, U.S. Pat. 3,041,306; Baer, U.S. Pat. 3,041,307; Baer, U.S. Pat. 3,041,308; Baer, U.S. Pat. 3,041,309; Salyer et al., U.S. Pat. 2,988,530; Baer et al., U.S. Pat. 3,085,082; Martin, U.S. Pat. 3,025,272; and the like.

Minor amounts of conventional additives such as stabilizers, fillers, colorants, processing aids, lubricants, plasticizers, coplasticizers, etc. can optionally be incorporated into such vinyl halide polymer blends as used in this invention, if desired. Thus, for example, among the processing aids and coplasticizers which may be incorporated into such blends used in this invention are paraffin; thermoplastic polymers, such as methyl methacrylate polymers, styrene-acrylonitrile copolymers, styrene-methyl-methacrylate copolymers, and the like. These blends may contain the conventional stabilizers, lubricants and fillers employed in the art for compounding vinyl chloride polymer blends, such as antimony oxide, titanium dioxide, calcium carbonate, magnesium silicate, etc., and epoxy components. The blends used in this invention may also include an inert or surface-treated inorganic filler, either in finely divided particulate form or in the form of fibers. Particle sizes are typically under about 10 micron. Usually the total amount of such additives in a given blend does not exceed about 5 or 8 weight percent thereof, though somewhat more can be added, assuming no adverse effect on the above indicated physical properties of a third layer.

The blends used in the present invention may be prepared by any of the conventional processing techniques, and the design of the apparatus used therefor may vary considerably. It is possible to initially blend the components utilizing suitable equipment, such as high intensity blenders, mill rolls, etc. to form a preliminary blend in which the matrix polymer is fused, which is then divided and utilized as a feedstock for an extruder. However, it may be more convenient to form the extrusion blend directly in the extruder without any preliminary processing other than premixing, such as in a ribbon blender. In such a case, the polymeric components will initially be a powder or in another particular form. The matrix polymer may be less finely divided, e.g. in the form of pellets, since this material is used during processing and loses its particulate identity.

A product blend is conveniently made into sheet or film form by the usual techniques conventionally employed in the plastics industry to make such plastic materials, the processing temperature of the stock normally being in the range of about 150–220° and preferably about 170–200° C.

The respective moduli of elasticity associated with the first and with the third layers used in composites of this invention are conveniently measured using 0.5 inch samples of such respective layers and ASTM procedure No. D–882–61–T, as summarized by the following Table A.

TABLE A.—CLASSIFICATION OF FILM AND SHEETING (ASTM D-882-61-T) MODULUS OF ELASTICITY [1]

|  | Rigid | Semi-rigid |
| --- | --- | --- |
| Strain gauge used | Yes | Yes |
| Initial grip separation, 3 in. | | |
| Rate of grip separation, 1.0 in./min | $3.5–6 \times 10^5$ | $2–3.5 \times 10$ |

[1] Determined on ½ in. samples and expressed in pounds per square inch.

Methods of fabrication and use

As indicated above, any convenient technique for making the composites of this invention can be employed. One method involves the step of first forming a deck of respective individual sheets of preformed first layer, preformed second layer and preformed third layer, sequentially. Thereafter, one applies to the opposed, exposed faces of the resulting deck elevated temperatures and pressures for a time sufficient to cause matrix layers to flow through open spaces in the interlayer(s), thereby to consolidate and laminate together the first and the third layers to form the desired composites. This method can be continuously practiced.

In making a composite of this invention by lamination involving forming or laying up a deck of alternatnig sheets (as indicated above), it will generally be convenient to employ temperatures in the range of from about 100° C. to 225° C., pressures in the range of from about 10 p.s.i. to 1000 p.s.i. and times in the range of from about 0.1 second to 30 minutes. Pressures, temperatures and times which are greater or smaller than these specific values can, of course, be employed without departing from the spirit and scope of the invention depending on the needs of an individual use situation. In general, the lamination conditions are such that the matrix sheets are caused to flow through open spaces in interlayers to form a desired monolithic structure in the composite with substantially no open spaces between the former individual layers.

Non-planar composites can be made by conventional techniques as those skilled in the art will appreciate. For example, tubes can be made from flat sheet-like composites by thermoforming the sheets on a form and welding the seams together as by molding. The tubes can also be produced by continuous extrusion using a tube die and feeding in a preformed cylindrical interlayer to the die. Two dies can be used for continuous lamination or a single die can be used to effectively encapsulate a preformed interlayer. Temperatures generally above the melting point of the particular interpolymer system used are preferably employed (e.g. 125–225° C.). Sometimes roll pressures sufficient to cause fusion through overlapping faces of matrix material are valuable in forming three-dimensional shapes. Typical roll pressures range from about 40 to 400 pounds per square inch.

To cold-form a sheet-like composite of the present invention, one simply applies in a generally continuous manner sufficient pressure to at least one surface thereof so as to conform the starting composite to a predetermined shape, room temperatures can be employed. In general, conventional cold-forming procedures known to the art can be employed including preforming (both by shallow draw stamping and deep draw forming), hydroforming, drop forging, explosion forming, brake bending, compression molding, and the like.

Articles of manufacture made from the composites of this invention generally comprise shaped bodies formed from a sheet-like composite of the invention by applying to such composite (as indicated above) sufficient pressure in a generally continuous manner to convert the starting composite into the desired shaped body.

DESCRIPTION OF THE DRAWINGS

The invention is illustrated by reference to the attached drawings wherein:

Referring to FIG. 1, there is seen illustrated a process for making a composite of this invention. A first layer 15, a second layer 16, and a third layer 17 are laid up sequentially in face-to-face engagement as shown, and the assembly is clamped between the heated jaws 18 of a press. After the first and third layers heat soften, they flow through openings in second layer 16 and fuse together at points of interfacial contact therebetween to form a solid, monolithic structure (see FIG. 2).

Referring to FIG. 2, there is seen a composite of this invention designated in its entirety by the numeral 10. Composite 10 is seen to comprise a first layer 15, a second layer 16, and a third layer 17, as these respective layers are herein described and illustrated.

EMBODIMENTS

Figure 1:
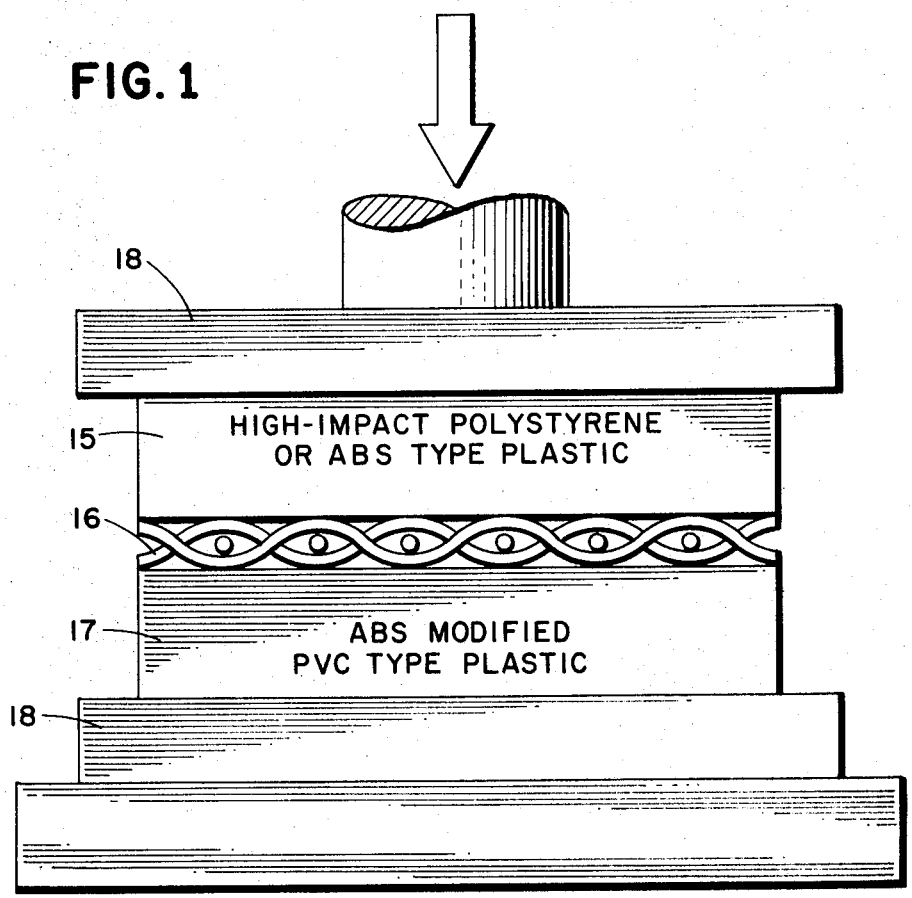
FIG. 1 illustrates a method of making a composite of this invention.

The following examples are set forth to illustrate more clearly the principles and practices of this invention to one skilled in the art, and they are not intended to be restrictive but merely to be illustrative of the invention herein contained. Unless otherwise stated herein all parts and percentages are on a weight basis.

Examples A through F

Square sheets composed of rubber modified interpolymer systems of styrene graft copolymers are prepared. The characteristics and composition of each such sheet being as given below in Table II.

TABLE II.—FIRST LAYERS

| Example designation | Sheet thickness (mils)[1] | Modulus elasticity, lbs./in.$^2$ at 73° F. | Tensile elongation, percent at 73° F. | Composition (Numbers refer to footnotes) |
|---|---|---|---|---|
| A | 35 | 300,000 | 40 | [2] |
| B | 60 | 400,000 | 25 | [3] |
| C | 125 | 300,000 | 40 | [2] |
| D | 60 | 330,000 | 20 | [4] |
| E | 60 | 370,000 | 28 | [5] |
| F | 30 | 220,000 | 40 | [6] |

[1] 1 mil equals 0.001 inch.
[2] A graft copolymer of 82 weight percent styrene/acrylonitrile copolymer superstrate on 18 weight percent butadiene elastomer substrate made according to teachings of U.S.P. 3,328,488.
[3] A graft copolymer of 92.5 weight percent styrene/acrylonitrile copolymer superstrate on 7.5 weight percent butadiene elastomer substrate made according to teachings of U.S.P. 3,328,488.
[4] A graft copolymer found by analysis to contain about 80 to 85 weight percent styrene/acrylonitrile copolymer superstrate on about 15 to 20 weight percent polyalkyl acrylate ester elastomer substrate available commercially under the trade designation "Luran-S" from Badische Anilin and Soda Fabrik, Germany.
[5] A graft copolymer found by analysis to contain styrene/acrylonitrile/methylmethacrylate terpolymer on a polybutadiene elastomer substrate available commercially under the trade designation "XT" from the American Cyanamid Company and preparable by the teachings of U.S.P. 3,354,238.
[6] A mixture of homopolystyrene and a graft copolymer of styrene polymer superstrate on a butadiene substrate containing 92½ weight percent styrene and 7½ weight percent butadiene, the graft copolymer therein having been prepared by the teachings of U.S.P. 3,444,270.

Examples G through L

Square samples of metal interlayers are prepared, the characteristics and composition of each being as summarized in Tables IIIA, IIIB, IIIC, and IIID, below, the dimensions of each such sample matching those of Examples A through F (above).

TABLE IIIB.—PERFORATED SHEET METAL INTERLAYER

Ex. designation—J
Sheet thickness (mils)—16
Modulus elasticity lbs./in.$^2$ at 73° F.—16×10$^6$
Tensile strength lbs./in.$^2$ at 73° F.—70×10$^3$
Tensile elongation percent at 73° F.—20
Type metal in sheet—Brass
Number holes in sheet per sq.in.—169
Average individual hole size (in.)—0.050

TABLE IIIC.—METAL WOOL INTERLAYER

Ex. designation—K
Interlayer thickness (in. measured in air under no load—0.25
Avg. max. individual fiber cross-sectional dimension (inches)—.002 to .004
Type metal—Steel [1]
Apparent length-to-width ratio of more than 95 weight percent—in excess 10$^3$/1.

[1] Made from steel wire having an ultimate tensile strength over 120,000 pounds per square inch and believed to contain from about 0.10 to 0.20 percent carbon, from about 0.50 to 1 percent manganese, and from about 0.02 to 0.09 percent sulphur.

TABLE IIID.—HONEYCOMB INTERLAYER

Ex. designation—L
Honeycomb material—3003 alloy aluminum
Transverse thickness (inches)—.015
Width-height ratio of solid materials portions—less than 1
Geometric shape of open spaces in honeycomb—Hexagonal
Cell size (in.)—⅛
Core density (lbs./ft.$^3$)—3.1

Examples M through Q

Square sheets composed of modified polyvinyl halide are prepared, the characteristics and composition of each such sheet being as given below in Table IV, the dimensions of each such sheet matching those of Example A through F (above). All such sheets have tensile elongations to fail in excess of 5 percent at 73° F.

TABLE IVA.—THIRD LAYERS

| Example designation | Sheet thickness (mils)[1] | Modulus of elasticity, lbs./in.$^2$ at 73° F. | Composition (Numbers refer to footnotes) |
|---|---|---|---|
| M | 30 | 3×10$^5$ | [2] |
| N | 125 | 3×10$^5$ | [2] |
| O | 60 | 4.5×10$^5$ | [3] |
| P | 60 | 3.5×10$^5$ | [4] |
| Q | 60 | 3×10$^5$ | [5] |

[1] 1 mil equals .001 inch.
[2] This composition of polyvinyl chloride and interpolymer modified uses a homopolymer of vinyl chloride having a specific viscosity in cyclohexanone at 20° C. of about 0.48 and has the formulation shown in Table IVB below.
[3] This composition uses a homopolymer as in Footnote 2 and has the formulation shown in Table IVB below.
[4] This composition uses a homopolymer as in Footnote 2 and has the formulation shown in Table IVB below.
[5] This composition uses a copolymer of vinyl chloride and vinyl acetate made using 3 weight percent vinyl acetate monomer and has an inherent viscosity in cyclohexanone at 25° C. of about 1.07 and has the formulation shown in Table IVC below.

TABLE IIIA.—WOVEN WIRE MESH INTERLAYERS

| Example designation | Mesh thickness (mils) | Modulus elasticity, lbs./in.$^2$ at 73° F. | Tensile strength, lbs./in.$^2$ at 73° F. | Tensile elongation, percent at 73° F. | Type metal used in mesh | Wire gauge (in.) | Mesh size |
|---|---|---|---|---|---|---|---|
| G | 22 | 30×10$^6$ | 81,500 | 3 | Galvanized steel. | .011 | 13 |
| H | 20 | 10×10$^6$ | 35,800 | 10 | Aluminum | .010 | 16 |
| I | 18 | 25×10$^6$ | 98,200 | 40 | Stainless steel. | .009 | 18 |

TABLE IVB.—SHEET COMPOSITION

| Component | Parts by weight | | |
|---|---|---|---|
| | Composition 2 * | Composition 3 * | Composition 4 * |
| Polyvinyl chloride resin | 75 | 80 | 80 |
| Interpolymer I [1] | 25 | | |
| Interpolymer II [2] | | 20 | 20 |
| Dioctyl phthalate (plasticizer) | | | 22 |
| 2-6-di-tert-butyl-4-methyl phenol (anti-oxidant) | 0.5 | 0.5 | 0.5 |
| Tin mercaptide (stabilizer) | 2 | 2 | 2 |
| Calcium stearate (lubricant) | 1 | | |
| Amide wax [3] (lubricant) | | 1 | 1 |

[1] Interpolymer I is a graft copolymer of 50/50 styrene/acrylonitrile superstrate grafted on 70/30 butadiene/styrene substrate made according to U.S.P. 3,328,488.
[2] This methylmethacrylate/butadiene/styrene rubbery modifier is a graft copolymer of 90 percent grafting efficiency of styrene/methylmethacrylate copolymer superstrate on a styrene/butadiene elastomer substrate. The material is formed from about 30 percent methylmethacrylate, about 30 percent styrene, and about 30 percent butadiene. A minor amount of styrene/methylmethacrylate copolymer is present. The material is available commercially under the trade designation Kave Ace B-12 from Mitsui and Co., Inc., U.S.A.
[3] This lubricant is a synthetic amide wax.
* Numbers refers to Table IVA footnotes.

TABLE IVC.—SHEET COMPOSITION

| Component: | Parts by weight composition (5)* |
|---|---|
| Polyvinyl chloride copolymer resin | 80 |
| Interpolymer III [1] | 20 |
| Dioctyl phthalate (plasticizer) | 15 |
| Lead phosphite (stabilizer) | 5 |
| Di-basic lead stearate [2] | 0.75 |

[1] Interpolymer III is a graft polymer of styrene and acrylonitrile on a butadiene elastomer substrate. The material is available commercially under the trade designation Blendex 311 from the Borg-Warner Company.
[2] The material is available commercially under the trade designation DS-207 from National Lead Company.
*Number refers to Table IVA footnotes.

Examples 1 through 7

Figure 2:
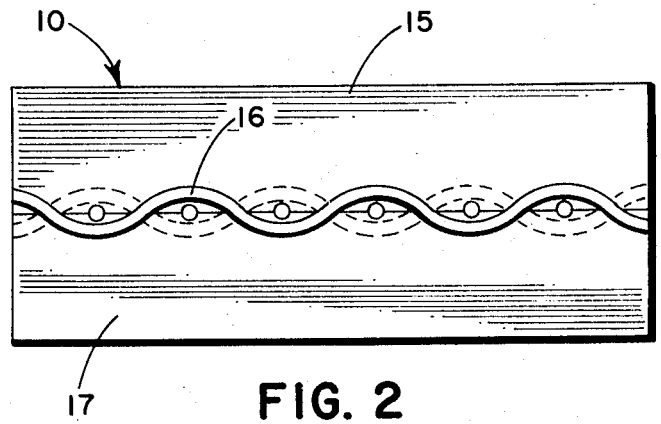
FIG. 2 is an enlarged vertical sectional view of one embodiment of a composite of this invention.

Using the foregoing first layers of Examples A through F, the foregoing second layers of Examples G through L and the foregoing third layers of Examples M through Q, composites of the invention are prepared of the type shown in FIG. 1 of the drawings using the procedure illustrated in FIG. 2 thereof. Each composite is exposed to a temperature of about 350 to 400° F. using a pressure of about 500 lbs./in.$^2$ for a time of about 20 minutes before removal from the heated press and being allowed to cool to room temperature. Constructional details are reported below in Table V.

Each such composite product is found to be cold formable and heat resistant.

Those skilled in the art will appreciate that multi-layered composites can be produced which will contain, for example, at least two of the first layers, the second layers, or the third layers beyond composites containing only a first layer, a second layer and a third layer.

In general, the composites of this invention are characterized by dimensional stability and by substantial freedom from stress cracking over wide environmental temperature ranges.

TABLE V.—COMPOSITES

| Example No. | First layer type (Table II) | Second layer type (Table III) | Third layer type (Tables IV) | Composite thickness (mils) | Percent thickness of composite occupied by second layer (est.) |
|---|---|---|---|---|---|
| 1 | A | I | M | 65 | 28 |
| 2 | C | I | N | 250 | 7.2 |
| 3 | B | G | O | 120 | 18 |
| 4 | D | H | O | 120 | 17 |
| 5 | E | J | P | 120 | 13 |
| 6 | F | K | Q | 90 | 10 |
| 7 | B | L | Q | 120 | 12.5 |

What is claimed is:

1. A sheet-like composite which is adapted to be cold-formable and heat resistant comprising:

(A) a first layer comprising at least one interpolymer having a superstrate composed of from about 50 to 98 weight percent of chemically combined monovinyl aromatic compound and from about 0 to 48 weight percent of chemically combined other monomer polymerizable therewith grafted upon a substrate from about 2 to 50 weight percent (all based on 100 weight percent interpolymer) of an elastomer having a glass phase transition temperature below about 0° C. and a Youngs Modulus of less than about 40,000 p.s.i., said first layer being further characterized by having:

(1) a transverse average thickness of from about 0.007 to 0.25 inch,
(2) a modulus of elasticity of from about 200,000 to 600,000 p.s.i. at 73° F., and
(3) a tensile elongation to fail of at least about 5 percent at 73° F., (B) a second layer comprising on a 100 weight percent basis from about 5 to 70 weight percent of generally continuous, generally elongated metal portions with open spaces defined therebetween, at least about 95 weight percent of said metal portions having a maximum length to minimum width ratios of at least about $10^3/1$ (in a 6.0 inch square sample of said second layer), and said second layer having a transverse average thickness ranging from about 2 to 85 percent of the total transverse average thickness of said composite, and (C) a third layer comprising from about 50 to 98 weight percent of at least one vinyl halide polymer and from about 2 to 48 weight percent of at least one interpolymer having a superstrate comprising from about 20 to 80 weight percent chemically combined monovinyl aromatic compound and, correspondingly, from about 80 to 20 weight percent chemically combined alpha-electronegatively substituted ethenes (based on 100 weight percent superstrate) grafted upon an elastomer substrate having a glass phase transition temperature below about 0° C. and a Youngs Modulus of less than about 40,000 p.s.i., and which comprises from about 2 to 50 weight percent of total interpolymer weight (the balance up to 100 weight percent of said interpolymer being said superstrate), said third layer being further characterized by having:

(1) a transverse average thickness of from about 0.007 to 0.25 inch,
(2) a modulus of elasticity of from about 200,000 to 600,000 p.s.i. at 73° F., and
(3) a tensile elongation to fail of at least about 5 percent at 73° F., and (D) said second layer being positioned between said first layer and said third layer and being substantially completely enclosed thereby, and said first layer and said third layer being bonded to one another at substantially all places of interfacial contact therebetween through said second layer's open spaces.

2. The composite of claim 1 wherein the first layer comprises a graft copolymer of a styrene superstrate grafted on a butadiene substrate.

3. The composite of claim 1 wherein the first layer comprises a graft copolymer of a styrene/acrylonitrile superstrate grafted on a butadiene substrate.

4. The composite of claim 1 wherein the second layer is a wire mesh.

5. The composite of claim 1 wherein the second layer is steel wool.

6. The composite of claim 1 wherein the third layer comprises a homopolymer of polyvinyl chloride.

7. The composite of claim 1 wherein said third layer comprises a copolymer of polyvinyl chloride.

References Cited

UNITED STATES PATENTS

| | | | |
|---|---|---|---|
| 2,527,299 | 10/1950 | Phillips | 161—95X |
| 3,068,043 | 12/1962 | Komenda | 161—89X |
| 3,328,488 | 6/1967 | Delacretaz et al. | 260—880 |
| 3,334,156 | 8/1967 | Calentine et al | 260—884 |
| 3,354,238 | 11/1967 | Schmitt et al. | 260—876 |
| 3,382,136 | 5/1968 | Bugel et al. | 161—165 |
| 3,426,101 | 2/1969 | Ryan et al. | 260—876 |
| 3,444,270 | 5/1969 | Aliberti et al. | 260—878 |

ROBERT F. BURNETT, Primary Examiner

R. L. MAY, Assistant Examiner

U.S. Cl. X.R.

161—95, 153, 216, 253; 260—876